May 26, 1931.  H. G. CUNNINGHAM  1,806,893
INSIDE MICROMETER CALIPER
Filed Feb. 23, 1929
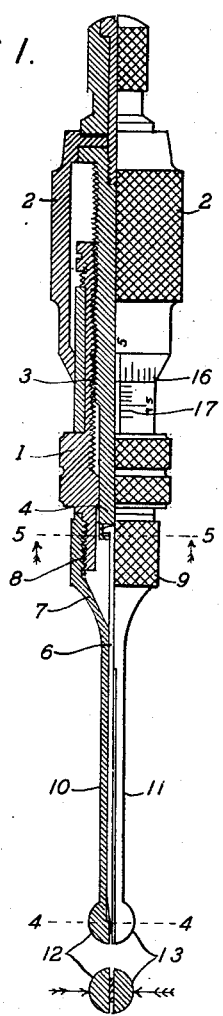
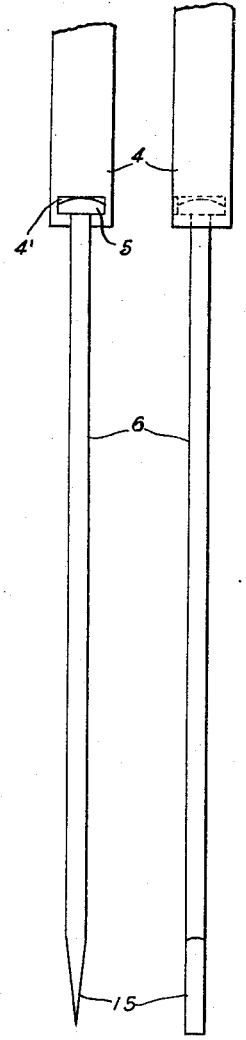
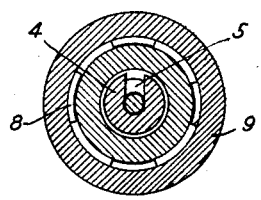
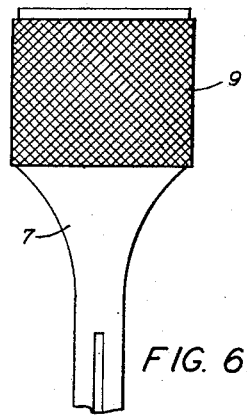
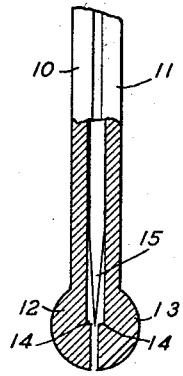
INVENTOR
Harry G. Cunningham Patented May 26, 1931

1,806,893

UNITED STATES PATENT OFFICE

HARRY G. CUNNINGHAM, OF LOS ANGELES, CALIFORNIA

INSIDE MICROMETER CALIPER

Application filed February 23, 1929. Serial No. 341,905.

My invention relates to improvements in micrometers and more especially to instruments of such a character, used for gauging and measuring the inside diameters and sizes of holes, and has for its objects, first; to provide an instrument which may be easily set by reference to a standard gauge to a predetermined size and which may be introduced into the hole to be measured; second, to provide means, in such an instrument, whereby after the gauge is set to a predetermined size and inserted in the hole to be measured the gauging elements may be expanded to bear against the inner walls of the hole and this distance read directly on the instrument; third, to provide for easily interchangeable, gauging elements upon the main body of the instrument bearing the scale.

I attain these objects by the device illustrated in the accompanying drawings in which—

Figure 1 is a general view of the entire device with the interior parts shown in semisection; Figure 2 is an enlarged side elevational view of the expanding plunger. Figure 3 is a similar view but showing the flat side thereof; Figure 4 is a section of the measuring legs of the device on line 4—4, Figure 1; Figure 5 is a section on line 5—5, Figure 1; Figure 6 is an enlarged elevational view of the measuring tip with a portion of the lower part in section showing the expanding plunger in position within the measuring legs.

Similar numerals refer to similar parts throughout the several views.

The body of the instrument 1, is provided with the rotating sleeve 2 turning on the screw thread 3. Turning with 2 and moving therewith relative to the body 1 is the plunger piston 4 which is shaped as shown in Figures 2, 3 and 5 to receive the head 5 of the expanding plunger 6 in the recess 4'.

The gauge tip 7 is attached to the body 1 by the intermittent thread 8 within the ferrule 9. The body of the gauge tip below this ferrule is slotted as shown in Figure 6 thus providing the expansible legs 10 and 11, which terminate in the respective measuring tips 12 and 13. The center of the gauge tip is drilled out to receive the round middle portion of the plunger 6, said hole extending to within a short distance from the end of the legs where shoulders 14 are formed. As the plunger 6 moves longitudinally within the hollow part of the gauge-tip the wedge shaped lower portion 15 operates against the shoulders 14 forcing the tips 12 and 13 of the legs 10 and 11 apart as it moves downwardly, and allowing them to contract to their normal position, by reason of the spring of the material, when moved upwardly.

The distance measured is between the outermost parts of the measuring-tips 12 and 13 as indicated by the arrow Figure 4. The angle of the wedge 15 is given a predetermined value such that for each turn of the sleeve 2 upon the body 1, the tips are spread a measurable distance, easily coordinated with the micrometer scale on 1 and 2. Thus, for instance, in the present embodiment of my device, for each revolution of the sleeve 2, the tips are expanded 5/1000 of an inch, and for each unit upon the scale 16, on sleeve 2, the tips are expanded 1/10,000 of an inch.

Operation of my device is as follows:—The desired gauge-tip is selected, and its corresponding expanding plunger inserted in placed in the end of piston 4. The gauge tip is then slipped over the plunger and locked in place upon the body 1 by a turn of the screw 8. The measuring tips are then inserted in a standard hole gauge or other suitable standard of measurement and the sleeve 2 rotated until the play in the coupling 4 has been taken up and the wedge 15 is forcing the measuring tips out firmly against the sides of the hole-gauge. The reading is then noted, on the scale 17, on the body and scale 16 on sleeve 2. The measuring tips are then inserted into the hole to be measured and the sleeve 2 rotated to force the plunger piston down until the measuring tips 12 and 13 are forced firmly outward against the walls of this hole. The scales are then again read. The accurate inside diameter of the hole to be measured is then the sum of the standard gauge hole plus the distance shown by the readings on the scale on the instrument.

It is to be understood that the measuring tips on the interchangeable gauge tip need not be round as shown, but may be hammer shaped, the measurements then being taken over the respective hammer faces.

Having now desired my invention and its operation, I realize that the present form is subject to modification and changes which would, nevertheless, remain within the spirit of my invention, I wish therefore to be limited only by the following claims:—

I claim:

1. In an inside micrometer caliper, in combination, a cylindrical body having an internal screw thread, a rotatable sleeve operative upon said body, a plunger piston within said body and having a screw thread engaging that of the body, the piston being connected at one end with the sleeve and having a circular recess at the other and adapted to receive the flanged head of an expansion element, an expansion element having such head at one end, the other end being wedge shaped, an element having separable measuring legs and adapted to be attached to said body, said legs adapted to cooperate with the wedge of said expansion element so as to be separated thereby substantially as described.

2. In an inside micrometer caliper, in combination, a cylindrical body having an internal screw thread, a rotatable sleeve operative upon said body, a plunger piston within said body and having a screw thread engaging that of the body, the piston being connected at one end with the sleeve and having a circular recess at the other end adapted to receive the flanged head of an expansion element, an expansion element having such head at one end, the other end being wedge shaped, a removable measuring element having separable measuring legs and adapted to be attached to said body, said legs having interiorly positioned shoulders adapted to cooperate with the wedge of said expansion element so as to separate the tips thereof, substantially as described.

HARRY G. CUNNINGHAM.